INVENTORS
STEPHEN J. ROBINSON
RALPH LEVY
ROBERT N. ALCOCK

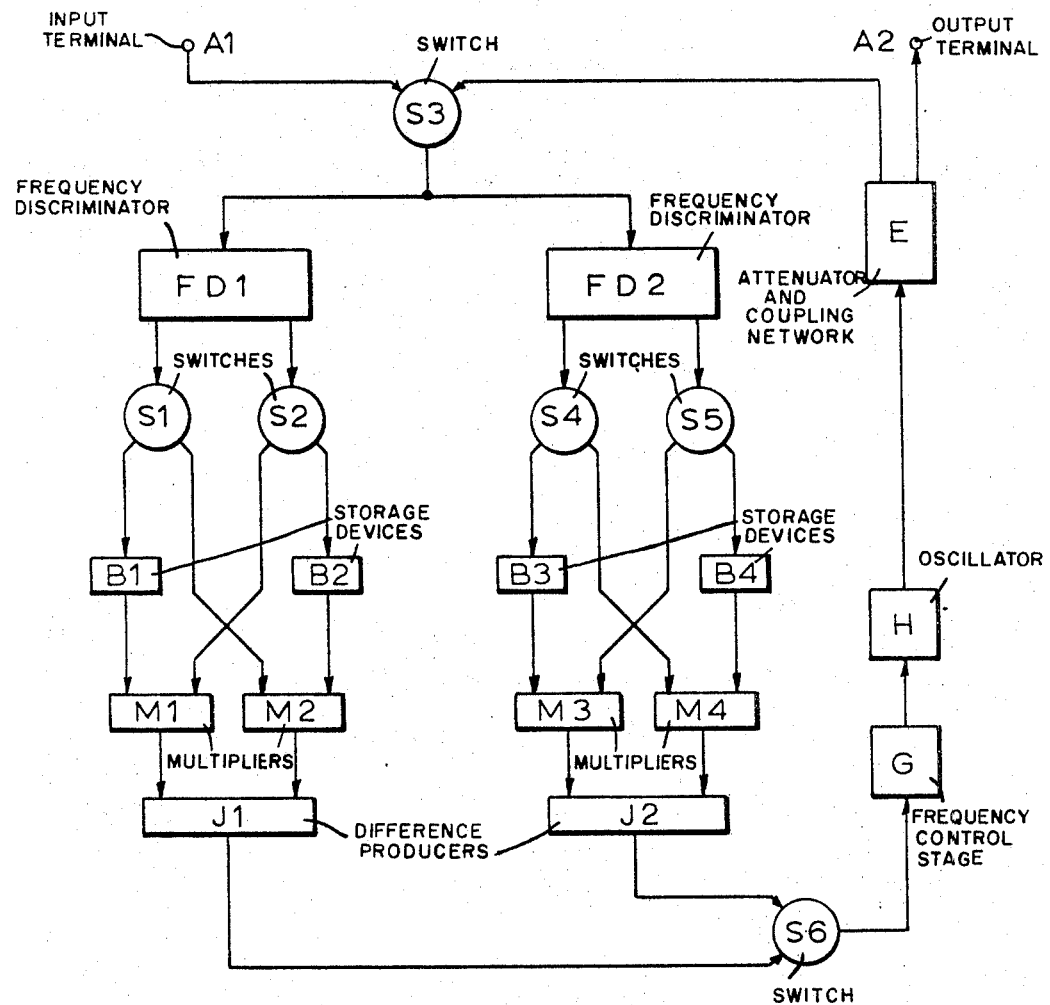

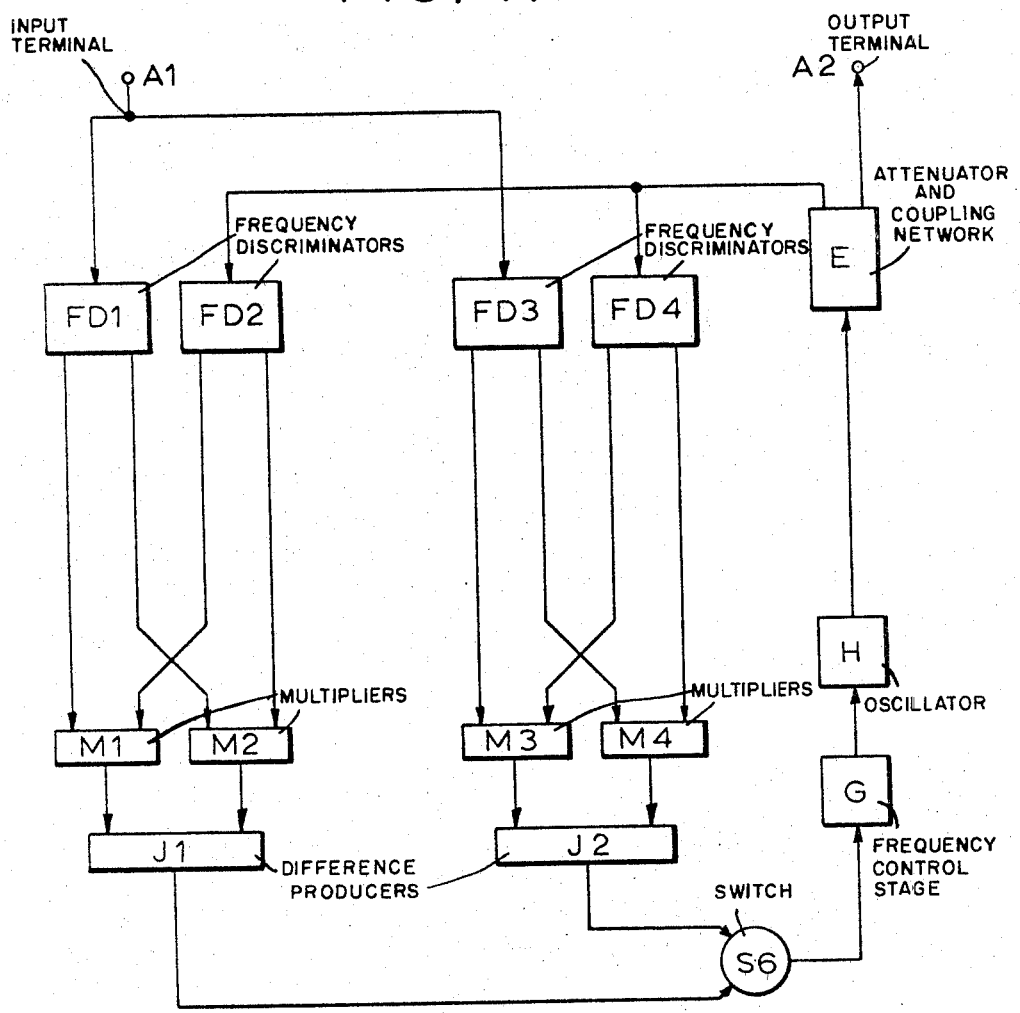

United States Patent Office 3,378,787
Patented Apr. 16, 1968

3,378,787
SYSTEM FOR SYNCHRONIZING AN OS-
CILLATOR WITH OSCILLATIONS OF
UNKNOWN FREQUENCY
Stephen Joseph Robinson, Reigate, Surrey, Ralph Levy,
Carshalton, Beeches, Surrey, and Robert Nicholas
Alcock, Ewell, England, assignors to North American
Philips Company, Inc., New York, N.Y., a corporation
of Delaware
Filed June 13, 1966, Ser. No. 557,125
Claims priority, application Great Britain, June 14, 1965,
25,122/65
5 Claims. (Cl. 331—14)

ABSTRACT OF THE DISCLOSURE

An oscillator synchronizing system comprises means for deriving direct current voltages having amplitudes proportional to the sines and cosines of $m\omega_0$ of an oscillator frequency, and $m\omega_s$ of an unknown signal frequency. ($m$ is a constant). The direct current voltages are cross-multiplied, and a difference voltage of the form $m(\omega_s - \omega_0)$ is derived from the result of the cross-multiplication. The difference voltage is employed to control the frequency of the oscillator.

This invention relates to a system which responds to the receipt of a signal of random frequency at an input terminal by applying a signal of substantially the same frequency to an output terminal. Such a system can be used to synchronize a local oscillator with a reference signal. Such a system can also be used, for example as a "frequency memory" when it is arranged to respond to signals of an unknown frequency and short duration by producing at a later time an output signal of the sense frequency but of such longer duration that its frequency can be measured.

According to the invention a locally-generated signal of the form $\cos \omega_0$ is synchronized by a reference signal of the form $\cos \omega_s$ by deriving from the reference signal a first pair of direct voltages having amplitudes respectively proportional to $\cos m\omega_s$ and $\sin m\omega_s$ where $m$ is a constant. A second pair of direct voltages having amplitudes respectively proportional to $\cos m\omega_0$ and $\sin m\omega_0$ is derived from the locally-generated signal. The two pairs of voltages are cross-modulated to produce two product voltages of magnitudes proportional to $\sin m\omega_s \cdot \cos m\omega_0$ and $\cos m\omega_s \cdot \sin m\omega_0$ respectively. The product voltages are subtracted to produce a difference voltage of magnitude proportional to $\sin m(\omega_s - \omega_0)$ and this difference voltage is applied to a frequency-control circuit of the local-signal generator so as to cause the frequency of the local signal to approach that of the said reference signal. The various specified voltages may be derived from the two signals sequentially, those first derived being stored until the remaining derivation has been effected; alternatively the derivations may proceed simultaneously.

A frequency-synchronizing system according to the invention comprises a local oscillator, and frequency discriminator means for deriving the first pair of direct voltages from the reference signal and for deriving the second pair of direct voltages from the local oscillator. Two multiplying stages are provided for producing the two product voltages, and a subtraction stage is provided for subtracting the product voltages to produce a difference voltage. A frequency-control stage operable by the difference voltage is employed to cause the frequency of the local oscillator to approach that of the reference signal. The system may include storage devices such as delay lines to enable a single discriminator means to sample the two signals sequentially; alternatively separate discriminator means may be provided for simultaneous derivation of the direct voltages from the two signals. Four embodiments of the invention will now be described with reference to the accompanying figures which are block schematic diagrams of frequency-responsive systems.

Figure 1:
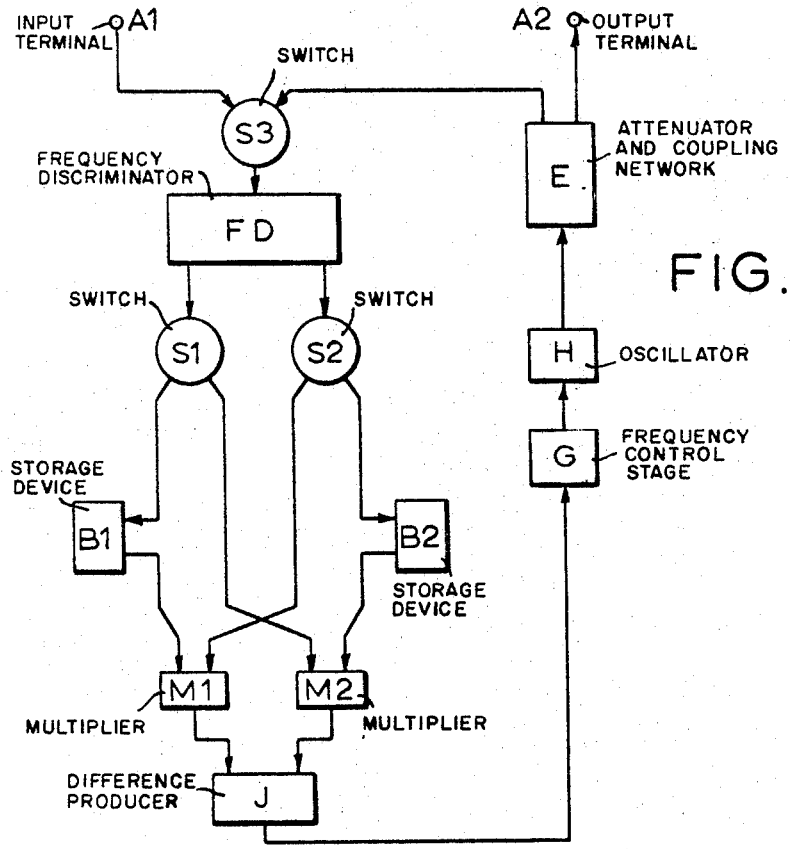
Figure 3:
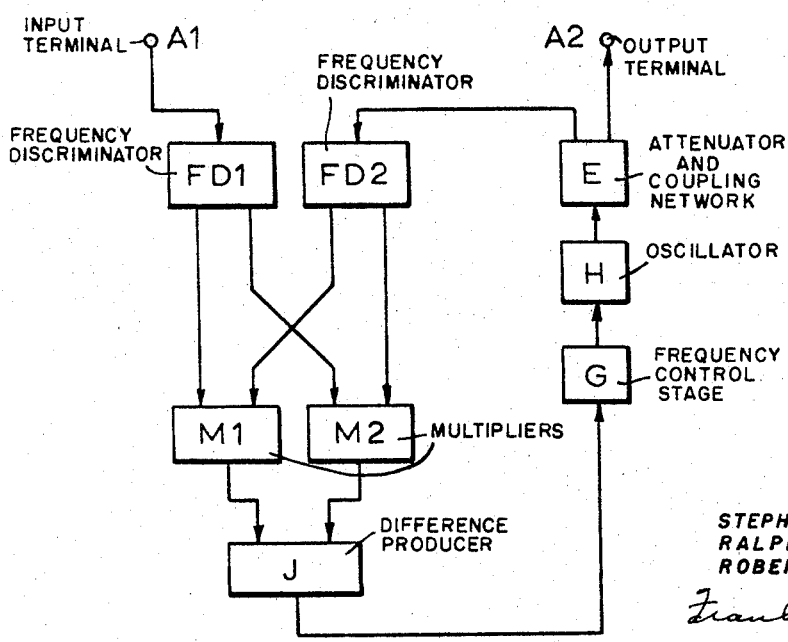

FIG. 1 is a block diagram of a frequency synchronizing system according to a first embodiment of the invention, FIG. 2 is a block diagram of a frequency synchronizing system according to a second embodiment of the invention, FIG. 3 is a block diagram of a frequency synchronizing system according to a third embodiment of the invention, and FIG. 4 is a block diagram of a frequency synchronizing system according to a fourth embodiment of the invention.

In FIG. 1 an input terminal A1 is connected to a switch S3 which is connected to apply to a frequency-discriminator FD, either a signal received at terminal A1 or a signal derived from a device E which will be described more fully later.

The frequency-discriminator FD is operable to produce from a signal of the form $A \cos \omega t$ two direct-voltage outputs respectively proportional to $A^2 \cos m\omega$ and $A^2 \sin m\omega$ where $m$ is equal to $L/C$ where $C$ is the velocity of propagation in the discriminator and where $L$ is the electrical difference length of the two paths in the discriminator. Each output is applied to a switch which is operable to direct its received signal to a storage device and thence to a multiplier M or directly to a multiplier of the other branch. These branches will be described more fully in the following disclosure. The output from the two multipliers M1 and M2 is subtracted in a difference stage J from which is derived a control voltage which is then applied to a frequency-controlling stage connected to control the frequency of an electrically-controlled oscillator H. The oscillator may for example be a backward wave oscillator. A portion of the energy produced by the stage H is applied, by an attenuator and coupling network E, to an input terminal of S3.

In order to appreciate more clearly the operation of the system, let us consider the result produced by the application of a signal of the form $A \cos \omega_s t$ to the input terminal A1. If the switch S3 is in a suitable position this signal is applied to the input of the frequency-discriminator FD which passes to switch S1 a voltage proportional to $A^2 \cos m\omega_s$ and passes to S2 a voltage proportional to $A^2 \sin m\omega_s$. The three switches S1, S2 and S3 are arranged to operate together and with S3 in the position already referred to then S1 and S2 will each be in such a position as to apply the direct voltage received from FD to a storage device B1 or B2. These storage devices may suitably be in the form of delay lines or capacitor or digital stores, and operate to store the direct voltages derived from the signals at terminal A1, for a period of time after these signals have ceased. At some later time S1, S2 and S3 are switched to their other positions. In these other positions a signal derived from the oscillator H and of the form $B \cos \omega_0 t$ is applied from E through S3 to the discriminator FD. From the discriminator a direct-voltage proportional to $B^2 \cos m\omega_0$ is applied through S1 to a multiplier stage M2 while a direct-voltage proportional to $B^2 \sin m\omega_0$ is applied simultaneously through S2 to a multiplier stage M1.

At the same time as these voltages which have been derived from the oscillator H are applied to the multiplier stages M1 and M2 the stored voltages derived from the signal incident upon terminal A1 are also applied to these multipliers. We thus have simultaneously two inputs to multiplier M1, respectively proportional to $A^2 \cos m\omega_s$ and $B^2 \sin m\omega_0$; similarly we have two simultaneous inputs to M2, respectively proportional to $A^2 \sin m\omega_s$ and $B^2 \cos m\omega_0$. These signals will produce at the output of M1 a voltage proportional to $A^2 B^2 \cos m\omega_s \cdot \sin m\omega_0$ and at the output of M2 a voltage proportional to $A^2 B^2 \sin m\omega_s \cdot \cos m\omega_0$.

If we subtract these in the stage J we then obtain, as a control voltage which can be applied to the frequency control stage G, a voltage proportional to $$A^2 B^2 \sin m(\omega_0 - \omega_s).$$

Thus it will be seen that when $\omega_0 = \omega_s$ that is to say when the frequency of the electrically-controlled oscillator H is equal to the frequency of the signal incident at A1, the output from J will be zero. The frequency-control stage G is arranged to respond to the voltage output from J in such manner as to cause the frequency of the oscillator stage H to approach that of the signal at A1. The output from H, after passing through the attenuator and coupling device E, appears at an output terminal A2.

FIGURE 2 illustrates a second embodiment comprising frequency-discriminators FD1 and FD2 fed in parallel from a switch S3 which is connected to apply to the inputs of both discriminators either a signal at terminal A1 or a signal from the attenuator network E. In operation, when A1 is connected through S3 to FD1 and FD2, direct-voltages proportional to $A^2 \cos m\omega_s$ and $A^2 \sin m\omega_s$ are applied from FD1 through switches S1 and S2 to storage devices B1 and B2 respectively while direct voltages proportional to $A^2 \cos n\omega_s$ and $A^2 \sin n\omega_s$ are applied from FD2 through switches S4 and S5 to storage devices B3 and B4 respectively; $m$ is equal to $L/C$ for discriminator FD1 and $n$ is equal to $L/C$ for discriminator FD2. As will become apparent, the discriminators have different characteristics, that is to say $m$ and $n$ are not equal.

At some later time the five switches S1 to S5 are switched to their other positions so that direct-voltages proportional to $B^2 \sin m\omega_0$, $B^2 \cos m\omega_0$, $B^2 \sin n\omega_0$ and $B^2 \cos n\omega_0$ are applied to M1, M2, M3 and M4 respectively while the voltages stored in the storage devices B1 to B4 are simultaneously applied to the other terminals of the multiplier stages. The voltages applied to the multiplier stages may be tabulated as follows:

| | |
|---|---|
| M1 | $A^2 \cos m\omega_s$ and $B^2 \sin m\omega_0$ |
| M2 | $B^2 \cos m\omega_0$ and $A^2 \sin m\omega_s$ |
| M3 | $A^2 \cos n\omega_s$ and $B^2 \sin n\omega_0$ |
| M4 | $B^2 \cos n\omega_0$ and $A^2 \sin n\omega_s$ |

After subtraction in stages J1 and J2 this yields:

| | |
|---|---|
| From J1 | $A^2 B^2 \sin m(\omega_s - \omega_0)$ |
| From J2 | $A^2 B^2 \sin n(\omega_s - \omega_0)$ |

We thus have two direct-voltages for application, through a selector switch S6, to the frequency-control stage and, by suitable choice of different discriminator characteristics $m$ and $n$, one can be used as a "coarse" frequency-control voltage while the other is suitable for "fine" control. By appropriately switching S6 from "coarse" to "fine" the oscillator H may be controlled over a large frequency-range.

Both the embodiments so far described operate on the principle of deriving direct-voltages from a reference signal and storing them in a storage device, and subsequently deriving other voltages from the locally-generated signal, extracting the stored voltages from the storage device and performing the multiplication, subtraction and frequency control operations. However, if desired the various specified voltages may be derived simultaneously by respective frequency-discriminators instead of using a frequency-discriminator which is switched between the two signal sources. Such an arrangement is illustrated in FIG. 3 which is similar to the arrangement illustrated in FIG. 2 in that it provides only one control-voltage which is applied to the frequency-control stage G.

As can be seen from FIG. 3 a reference signal at terminal A1 is applied directly to a frequency-discriminator FD1 and a locally-generated signal from oscillator H is applied through E to a frequency-discriminator FD2. From FD1 a direct-voltage proportional to $A^2 \cos m\omega_s$ is applied to multiplier M1 and a direct-voltage proportional to $A^2 \sin m\omega_s$ is applied to multiplier M2; from FD2 a direct-voltage proportional to $B^2 \cos m\omega_0$ is applied to M2 and a direct-voltage proportional to $B^2 \sin m\omega_0$ is applied to M1. The stages M1, M2, J and G function in the same manner as has been described with reference to FIG. 1. It is of course important that the frequency-discriminators FD1 and FD2 in this embodiment possess the same characteristic, that is to say have the same value of $m$.

In a similar manner to that in which the embodiment illustrated in FIG. 3 can be derived from the embodiment illustrated in FIG. 1, from the embodiment illustrated in FIG. 2 can be derived a fourth embodiment, illustrated in FIG. 4, comprising four frequency-discriminators FD1, FD2, FD3 and FD4. The arrangement of FIG. 4 provides fine and coarse frequency-control voltages, selectable by switch S6, with simultaneous derivation from the reference signal and the locally-generated signal.

What is claimed is:

1. A local oscillator for producing oscillations having an angular frequency $\omega_0$, and means for synchronizing said oscillator, comprising a source of reference oscillations of angular frequency $\omega_s$, means connected to said oscillator and said source for producing first, second, third and fourth direct current voltages having amplitudes proportional to $\cos m\omega_s$, $\sin m\omega_s$, $\cos m\omega_0$ and $\sin m\omega_0$ respectively, wherein $m$ is a constant, means for multiplying said first and fourth voltages to produce a fifth voltage and for multiplying said second and third voltages to produce a sixth voltage, means for producing a first difference voltage from said fifth and sixth voltages of a magnitude proportional to $\sin m(\omega_s - \omega_0)$, frequency control means connected to said oscillator, and means applying said first difference voltage to said frequency control means for controlling the frequency of said oscillator.

2. The arrangement of claim 1 comprising means connected to said oscillator and source for producing seventh, eighth, ninth and tenth direct current voltages having amplitudes proportional to $\cos n\omega_s$, $\sin n\omega_s$, $\cos n\omega_0$ and $\sin n\omega_0$ respectively, wherein $n$ is a constant different from $m$, means for multiplying said seventh and tenth voltages to produce an eleventh voltage, means for multiplying said eight and ninth voltages to produce a twelfth voltage, means for producing a second difference voltage from said eleventh and twelfth voltages of a magnitude proportional to $\sin n(\omega_s - \omega_0)$, and means for selectively applying said first and second difference voltages to said frequency control means, whereby said first and second voltages provide coarse and fine frequency control of said oscillator respectively.

3. The arrangement of claim 1 wherein said means for producing said first, second, third and fourth voltage comprises frequency discriminator means.

4. The arrangement of claim 1 wherein said means for producing said first, second, third and fourth devices comprises a frequency discriminator device having an input terminal, a first output terminal for providing a first direct current output voltage with an amplitude proportional to cos $m\omega$ where $\omega$ is the frequency of signals applied to the input terminal, and a second direct current output voltage with an amplitude proportional to sin $m\omega$.

5. The arrangement of claim 4 wherein said multiplying means comprises first and second multiplying systems, comprising first and second delay means, switch means having a first position for simultaneously connecting said source to said input terminal, connecting said first output terminal to said first multiplying system by way of said first delay means, and connecting said second output terminal to said second multiplying system by way of said second delay means, and having a second position for simultaneously connecting said input terminal to said oscillator, connecting said first output terminal directly to said second multiplying system, and connecting said second output terminal directly to said first multiplying system.

References Cited

UNITED STATES PATENTS 3,059,187  10/1962  Jaffe _____ 331—14 X

ROY LAKE, *Primary Examiner.*

S. H. GRIMM, *Assistant Examiner.*

UNITED STATES PATENT OFFICE

CERTIFICATE OF CORRECTION

Patent No. 3,378,787            April 16, 1968

Stephen Joseph Robinson et al.

It is certified that error appears in the above identified patent and that said Letters Patent are hereby corrected as shown below:

Column 1, line 35, "sense" should read -- same --.

Signed and sealed this 2nd day of September 1969.

(SEAL)
Attest:

Edward M. Fletcher, Jr.            WILLIAM E. SCHUYLER, JR.
Attesting Officer                          Commissioner of Patents